(12) United States Patent
De Silva et al.

(10) Patent No.: US 7,499,456 B2
(45) Date of Patent: Mar. 3, 2009

(54) MULTI-TIERED VIRTUAL LOCAL AREA NETWORK (VLAN) DOMAIN MAPPING MECHANISM

(75) Inventors: Suran S. De Silva, Cupertino, CA (US); Norman W. Finn, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 79 days.

(21) Appl. No.: 11/651,145

(22) Filed: Jan. 9, 2007

(65) Prior Publication Data

US 2007/0110078 A1 May 17, 2007

Related U.S. Application Data

(63) Continuation of application No. 10/282,846, filed on Oct. 29, 2002, now Pat. No. 7,180,899.

(51) Int. Cl.
*H04L 12/28* (2006.01)
*H04L 12/56* (2006.01)
(52) U.S. Cl. .............. 370/395.53; 370/392; 370/395.31
(58) Field of Classification Search .................. 370/392, 370/395.31, 395.53
See application file for complete search history.

(56) References Cited

U.S. PATENT DOCUMENTS

| | | | |
|---|---|---|---|
| 5,394,402 A | 2/1995 | Ross | |
| 5,740,171 A | 4/1998 | Mazzola et al. | |
| 5,742,604 A | 4/1998 | Edsall et al. | |
| 5,751,967 A | 5/1998 | Raab et al. | |
| 5,764,636 A | 6/1998 | Edsall | |
| 5,978,378 A | 11/1999 | Van Seters et al. | |
| 6,035,105 A | 3/2000 | McCloghrie et al. | |
| 6,067,298 A * | 5/2000 | Shinohara | 370/395.71 |
| 6,167,445 A | 12/2000 | Gai et al. | |
| 6,208,649 B1 | 3/2001 | Kloth | |
| 6,286,052 B1 | 9/2001 | McCloghrie et al. | |

(Continued)

FOREIGN PATENT DOCUMENTS

CN   1312631 A   9/2001

(Continued)

OTHER PUBLICATIONS

Jean-Marc Phelippeau, "Metro Business Services: New Network Solutions, New Business Opportunities for Alternative Service Providers," Apr. 11, 2002.

(Continued)

*Primary Examiner*—Ronald Abelson
(74) *Attorney, Agent, or Firm*—Cesari and McKenna LLP

(57) ABSTRACT

In one embodiment, a first port of a device provides connectivity to a customer network and a second port of the device provides connectivity to a provider network. Frame mapping logic associated with the first port processes a network message received at the first port and accesses a Virtual Local Area Network (VLAN) mapping data structure that maps customer VLAN designations used in the customer network to provider VLAN designations used in the provider network. Frame mapping logic uses the VLAN mapping data structure to associate the received network message with a particular provider VLAN designation based upon the received network message's particular customer VLAN designation. The received network message is then passed toward the second port.

20 Claims, 9 Drawing Sheets

U.S. PATENT DOCUMENTS

| | | |
|---|---|---|
| 6,434,624 B1 | 8/2002 | Gai et al. |
| 6,463,470 B1 | 10/2002 | Mohaban et al. |
| 6,466,984 B1 | 10/2002 | Naveh et al. |
| 6,643,260 B1 | 11/2003 | Kloth et al. |
| 6,741,592 B1 | 5/2004 | Edsall et al. |
| 6,862,280 B1 | 3/2005 | Bertagna |
| 6,907,001 B1 * | 6/2005 | Nakayama et al. .......... 370/230 |
| 2001/0005369 A1 | 6/2001 | Kloth |
| 2003/0152075 A1 * | 8/2003 | Hawthorne et al. ......... 370/389 |

FOREIGN PATENT DOCUMENTS

| | | |
|---|---|---|
| CN | 1356806 A | 7/2002 |
| WO | WO 00/72533 A1 | 11/2000 |

OTHER PUBLICATIONS

P802.1Q, D10, "Draft Standards for Local and metropolitan Area Networks: Virtual Bridged Local Area Networks," Institute of Electrical and Electronics Engineers, Inc., Mar. 1998, pp. 0-11, 76-86, and 46-66.

"InterSwitch Link Fram Format," Cisco Systems, Inc., 1992-2002.

"QoS Classification and Marking on Catalyst 6000 Family Switches Running in Hybrid Mode," Cisco Systems, Inc., 1992-2002.

Norman, Finn, "Bridged-Based Ethernet Service Provision," Rev. 2, Institute of Electrical and Electronics Engineers, Inc., 802.1, pp. 1-57.

"Catalyst 3550 Multilayer Switch Software Configuration Guide: Chapter 13, Configuring 802.1Q and Layer 2 Protocol Tunneling," Aug. 2002, Cisco IOS Release 12.1(11)EA1, pp. 13-1 through 13-14.

State Intellectual Property of the People's Republic of China, The First Office Action (PCT Application in Chinese National Phase), Filing No. 200380102431.9, Applicant: Cisco Technology, Inc., Date of Issue: Nov. 17, 2006, 12 pgs.

* cited by examiner

400c

| INGRESS VLAN MAPPING TABLE (PORT P4) | | | | | |
|---|---|---|---|---|---|
| CUSTOMER VLAN | PROVIDER VLAN | COS TABLE INDEX | REMOVE CUSTOMER VLAN | INGRESS VLAN BPDU FLAG | |
| 10 | 16 | 2 | Y | N | 412a |
| 11 | 10 | 1 | N | N | 412b |
| 12 | 10 | 3 | Y | N | 412c |
| 20 | 11 | 7 | N | N | 412d |
| 21 | 11 | 6 | N | N | 412e |
| 22 | 11 | 7 | N | N | 412f |
| NONE | 16 | 4 | N | Y | 412g |
| OTHER | 12 | 0 | N | N | 412h |
| 402 | 404 | 406 | 408 | 410 | |

EGRESS VLAN MAPPING TABLE (PORT P2)

| PROVIDER VLAN | ADD VLAN | PROVIDER VLAN TO BE ADDED | COS TABLE INDEX | |
|---|---|---|---|---|
| 10 | Y | 10 | 1 | ~610a |
| 11 | Y | 11 | 7 | ~610b |
| 12 | Y | 12 | 3 | ~610c |
| 13 | Y | 13 | 5 | ~610d |
| 14 | Y | 13 | 2 | ~610e |
| 15 | N | -- | 1 | ~610f |
| 16 | Y | 10 | 4 | ~610g |
| | | | | |

BPDU RECOGNITION AND TRANSLATION TABLE

| ADDRESS MASK | OLD DESTINATION MAC ADDRESS | NEW DESTINATION MAC ADDRESS | COS TABLE INDEX | |
|---|---|---|---|---|
| | | | | ~810a |
| | | | | ~810b |
| | | | | ~810c |
| | | | | ~810d |
| | | | | ~810e |
| | | | | ~810f |
| | | | | ~810g |
| | | | | ~810h |

INGRESS BPDU CLASSIFICATION AND TRANSLATION TABLE

| BPDU FOUND | INGRESS VLAN BPDU FLAG | TRANSLATE | RESULT | |
|---|---|---|---|---|
| NO | X | NO | CLASSIFY FRAME AS DATA, SEND FRAME TO FORWARDING ENGINE, LEARN SOURCE ADDRESS | 830a |
| YES | YES | YES | CLASSIFY FRAME AS CUSTOMER BPDU, TRANSLATE DESTINATION MAC ADDRESS, SEND FRAME TO FORWARDING ENGINE, DON'T LEARN SOURCE ADDRESS | 830b |
| YES | NO | NO | CLASSIFY FRAME AS PROVIDER BPDU, SEND FRAME TO SPANNING TREE PROTOCOL ENTITY | 830c |

| EGRESS BPDU CLASSIFICATION AND TRANSLATION TABLE | | |
|---|---|---|
| EGRESS BPDU FOUND | TRANSLATE | RESULT |
| NO | NO | NO OPERATION |
| YES | YES | TRANSLATE DESTINATION MAC ADDRESS |

MULTI-TIERED VIRTUAL LOCAL AREA NETWORK (VLAN) DOMAIN MAPPING MECHANISM

CROSS-REFERENCE TO RELATED APPLICATION

The present application is a continuation of U.S. patent application Ser. No. 10/282,846, which was filed on Oct. 29, 2002, now U.S. Pat. No. 7,180,899 by Suran S. De Silva and Norman W. Finn for a MULTI-TIERED VIRTUAL LOCAL AREA NETWORK (VLAN) DOMAIN MAPPING MECHANISM.

BACKGROUND OF THE INVENTION

1. Field of the Invention

The present invention relates to computer networks and, more specifically, to computer networks that have been segmented into a plurality of Virtual Local Area Net-works (VLANs).

2. Background Information

A computer network typically comprises a plurality of interconnected entities. An entity may consist of any network device, such as a server or end station, that "sources" (i.e., transmits) or "sinks" (i.e., receives) data frames. A common type of computer network is a local area network ("LAN") which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack).

One or more intermediate network devices are often used to couple LANs together and allow the corresponding entities to exchange information. For example, a bridge may be used to provide a "bridging" function between two or more LANs or end stations. Typically, the bridge is a computer and includes a plurality of ports that are coupled to the LANs or end stations. Ports used to couple bridges to each other are generally referred to as a trunk ports, whereas ports used to couple bridges to LANs or end stations are generally referred to as access ports. The bridging function includes receiving data from a sending entity at a source port and transferring that data to at least one destination port for forwarding to a receiving entity.

Although bridges may operate at various levels of the communication protocol stack, they typically operate at Layer 2 (L2) which, in the OSI Reference Model, is called the data link layer and includes the Logical Link Control (LLC) and Media Access Control (MAC) sub-layers. Data frames at the data link layer typically include a header containing the MAC address of the entity sourcing the message, referred to as the source address, and the MAC address of the entity to whom the message is being sent, referred to as the destination address. To perform the bridging function, L2 bridges examine the MAC destination address of each data frame received on a source port. The frame is then switched onto the destination port(s) associated with that MAC destination address.

Other devices, commonly referred to as routers, may operate at higher communication layers, such as Layer 3 (L3) of the OSI Reference Model, which in Transmission Control Protocol/Internet Protocol (TCP/IP) networks corresponds to the Internet Protocol (IP) layer. Packets at the IP layer also include a header which contains an IP source address and an IP destination address. Routers or L3 switches may re-assemble or convert received data frames from LAN standard (e.g., Ethernet) to another (e.g. token ring). Thus, L3 devices are often used to interconnect dissimilar subnetworks.

Virtual Local Area Networks

A computer network, such as LAN, may also be segregated into a series of logical network segments. For example, U.S. Pat. No. 5,394,402, issued on Feb. 28, 1995 to Ross (the "'402 Patent"), which is hereby incorporated by reference in its entirety, discloses an arrangement for associating any port of a bridge with any particular segregated network group. Specifically, according to the '402 Patent, any number of physical ports of a particular bridge may be associated with any number of groups within the bridge by using a virtual local area network (VLAN) arrangement that virtually associates the port with a particular VLAN designation. More specifically, Ross discloses a bridge or hub that associates VLAN designations with at least one local port and further associates those VLAN designations with messages transmitted from any of the ports to which the VLAN designation has been assigned.

The VLAN designation for each local port is stored in a memory portion of the hub such that every time a message is received by the hub on a local port the VLAN designation of that port is associated with the message. Association is accomplished by a flow processing element which looks up the VLAN designation in the memory portion based on the local port where the message originated. In addition to the '402 patent, the Institute of Electrical and Electronics Engineers (IEEE) has issued a standard for Virtual Bridged Local Area Networks, identified as the IEEE 802.1Q specification standard.

In many cases, it may be desirable to interconnect a plurality of these bridges or hubs in order to extend the VLAN associations of ports in the network. Ross, in fact, states that an objective of his VLAN arrangement is to allow all ports and entities of the network having the same VLAN designation to exchange messages by associating a VLAN designation with each message. Thus, those entities having the same VLAN designation function as if they are all part of the same LAN. VLAN-configured bridges and hubs are specifically configured to prevent message exchanges between parts of the network having different VLAN designations in order to preserve the boundaries of each VLAN segment. Intermediate network devices operating above L2, such as routers, can relay messages between different VLAN segments. The IEEE 802.1Q specification standard further calls for the addition of a VLAN Identifier (VID) field to the header of network messages. The VID field may be loaded with a numeric value (0-4095) corresponding to the message's VLAN designation. For administrative convenience, each VLAN designation is often associated with a different color, such as red, blue, green, etc.

FIG. 1 is a partial block diagram of a data link (e.g., Ethernet) frame 100 that complies with the IEEE 802.1Q specification standard. Frame 100 includes a header 102, a data field 104 and a frame check sequence (FCS) field 106. Header 102 includes a MAC destination address (DA) field 108, a MAC source address (SA) field 110 and a length/type field 111, which specifies the size of the data field 104. According to the 802.1Q specification standard, header 102 further includes a tag header 112 which is located immediately following the DA and SA fields 108, 110.

The tag header 112 includes a Tag Protocol Identifier (TPID) field 114, which identifies the frame as an IEEE 802.1Q type frame, and a tag control information field 116 which, in turn, comprises a plurality of sub-fields, including, a user_Priority field 118, a Canonical Format Indicator (CFI) field 120 and a Virtual Local Area Network Identifier (VID) field 122. The CFI field indicates whether the bit order of the VID field 122 is canonical or non-canonical. The VID field 122 is used to specify the frame's Virtual Local Area Network (VLAN) designation.

User Priority

The user_priority field 118 permits a network entity to select a desired priority that is to be applied to the frame 100. In particular, an IEEE appendix, referred to as the 802.1p specification standard, defines eight possible values of user priority (0-7), each of which is associated with a specific traffic type. The proposed user priority values and their corresponding traffic types, as specified in the 802.1p specification standard, are as follows.

| User Priority Value | Traffic Type | Description |
| --- | --- | --- |
| 1 | Background | bulk transfers |
| 2 | Spare/Reserved | n/a |
| 0 | Best Effort | current LAN traffic |
| 3 | Excellent Effort | best effort type of services (e.g., for an organization's most important customers) |
| 4 | Controlled Load | important business applications |
| 5 | Video (<100 milliseconds latency and jitter) | minimum jitter |
| 6 | Voice (<10 milliseconds latency and jitter) | one-way transmission through the LAN |
| 7 | Network Control | characterized by a "must get there" requirement to maintain and support the network infrastructure |

An intermediate network device may have a plurality of transmission queues per port and, pursuant to the 802.1p specification standard, may assign frames to different queues of a destination port on the basis of the frame's user priority value. For example, frames with a user priority of "0" are placed in the "0" level queue (e.g., non-expedited traffic), whereas frames with a user priority of "3" are placed in the level "3" queue. Furthermore, frames stored in a higher level queue (e.g., level 3/excellent effort) are preferably forwarded before frames stored in a lower level queue (e.g., level 1/background). This is commonly referred to as Priority Queuing. Thus, by setting the contents of the user_priority field 118 to a particular value, a network entity may affect the speed with which the frame traverses the network.

If a particular intermediate network device has less than eight queues per port, several of the IEEE traffic types may be combined. For example, if only three queues are present, then queue 1 may accommodate best effort, excellent effort and background traffic types, queue 2 may accommodate controlled load and video traffic types and queue 3 may accommodate voice and network control traffic types. The IEEE 802.1p specification standard also recognizes that intermediate network devices may regenerate the user priority value of a received frame. That is, an intermediate network device may forward the frame with a different user priority value (still within the range of 0-7) than the one it had when the frame was received. Nevertheless, the standard recommends that the user priority value be left un-changed.

Metropolitan Area Networks (MANs)

In many instances, several LANs and/or end stations may be interconnected by point-to-point links, microwave transceivers, satellite hook-ups, etc. to form a metropolitan area network (MAN) that may span several city blocks, an entire city and/or an entire metropolitan area, such as the San Francisco Bay Area. The MAN typically interconnects multiple LANs and/or end stations located at individual campuses and/or buildings that are physically remote from each other, but that are still within the metropolitan area. Conventional MANs typically rely on network equipment employing Asynchronous Transfer Mode (ATM) running over the existing Public Switched Telephone Network's (PSTN's) Synchronous Optical Network (SONET). As most LANs utilize the Ethernet standard, network messages or frames created at one LAN must be converted from Ethernet format into ATM cells for transmission over the SONET links. The ATM cells must then be converted back into Ethernet format for delivery to the destination LAN or end station. The need to convert each network message from Ethernet to ATM and back again requires the MAN to include expensive networking equipment. The MAN Provider also has to lease or otherwise obtain access to the SONET links. As a result, MANs can be expensive to build and operate.

In addition, it would be desirable to connect many different networks to a MAN. At least some of these different networks, however, may nonetheless be using the exact same VLAN designations to identify their traffic. Once such traffic enters the MAN, it can be difficult to ascertain from which particular network the traffic originated. This could result in forwarding errors by the MAN.

SUMMARY OF THE INVENTION

Briefly, the invention relates to a system and method for mapping network messages between a customer Virtual Local Area Network (VLAN) domain and a provider VLAN domain. More specifically, an intermediate network device, such as a bridge, has a plurality of ports for exchanging network messages, such as frames, in a computer network. The computer network may include one more customer networks and one or more provider networks that are segregated from each other. The bridge, moreover, may be disposed at the edge of a provider network and be coupled to a plurality of the customer networks. In accordance with the invention, the bridge's ports are specially configured to operate as either customer boundary ports, which are coupled to the customer networks, or as provider ports, which provide connectivity to other parts of the provider network. At the customer boundary ports, frames already having VLAN designations, referred to here as the frame's customer VLAN designation, are received from the customer networks. Frames received on the customer boundary ports may also include a Cost of Service (CoS) field specifying a desired service treatment level, referred to here as the frame's customer CoS value.

In accordance with the invention, the bridge selects a provider or transport VLAN designation for association with each frame received from the customer network based upon the particular port at which the frame is received and its customer VLAN designation. The bridge may also select a provider CoS value for association with the frame based upon the particular port on which the frame is received, the frame's customer VLAN designation and its customer CoS value. In the illustrative embodiment, the selected provider VLAN designation and provider CoS value are appended to the received frame, leaving the received customer frame unmodified. The new frame is then transported through the provider network. The other intermediate network devices within the provider network utilize the frame's provider VLAN designation and provider CoS value in making forwarding decisions. The provider VLAN designation and provider CoS value may be stripped off of the frame prior to its transmission out of the provider network.

In the illustrative embodiment, the bridges of the provider network are configured to include frame mapping logic as well as one or more highly flexible mapping tables for use in selecting or deriving the provider VLAN designation and the provider CoS value for association with frames received from a customer network. Specifically, each bridge includes one or more Ingress VLAN Mapping Tables, one or more Egress VLAN Mapping Tables, one or more CoS Mapping Tables and one or more Bridge Protocol Data Unit (BPDU) Classification/Translation Tables. In the preferred embodiment, each port has its own set of these tables. Upon receiving a frame from a customer network on a given port, the bridge performs a look-up on the Ingress VLAN Mapping Table using the given boundary port and the frame's customer VLAN designation, if any, to select the appropriate provider VLAN designation for association with the frame, and to identify the appropriate CoS Mapping Table. The bridge then performs a look-up on the identified CoS Mapping Table using the frame's customer CoS value to select the appropriate provider CoS value for association with the frame. The frame, including the provider VLAN designation and the provider CoS value, may be passed to a forwarding engine which identifies one or more outbound ports from which the frame is to be transmitted. Transmission of the frame from the identified outbound ports depends, at least in part, on the frame's provider VLAN designation, which may be used as an index to the Egress VLAN Mapping table. The Egress VLAN Mapping Table, moreover, can be used to modify frames being transported within the provider network as well as frames exiting the provider network. For example, the Egress VLAN Mapping table can be utilized to determine whether or not the frame is to be transmitted with the provider VLAN designation appended to it.

The bridge may also include or have access to certain resources or services, such as priority queues, filter settings, queue selection strategies, congestion control algorithms, high-speed links, etc., for use in forwarding network messages. A particular resource(s) may be selected for use in forwarding the frame based on the frame's provider CoS value.

BRIEF DESCRIPTION OF THE DRAWINGS

The invention description below refers to the accompanying drawings, of which:

FIGS. 4, 5, 6 and 8 are highly schematic illustrations of mapping tables utilized by the device of FIG. 3.

DETAILED DESCRIPTION OF AN
ILLUSTRATIVE EMBODIMENT

Figure 2:
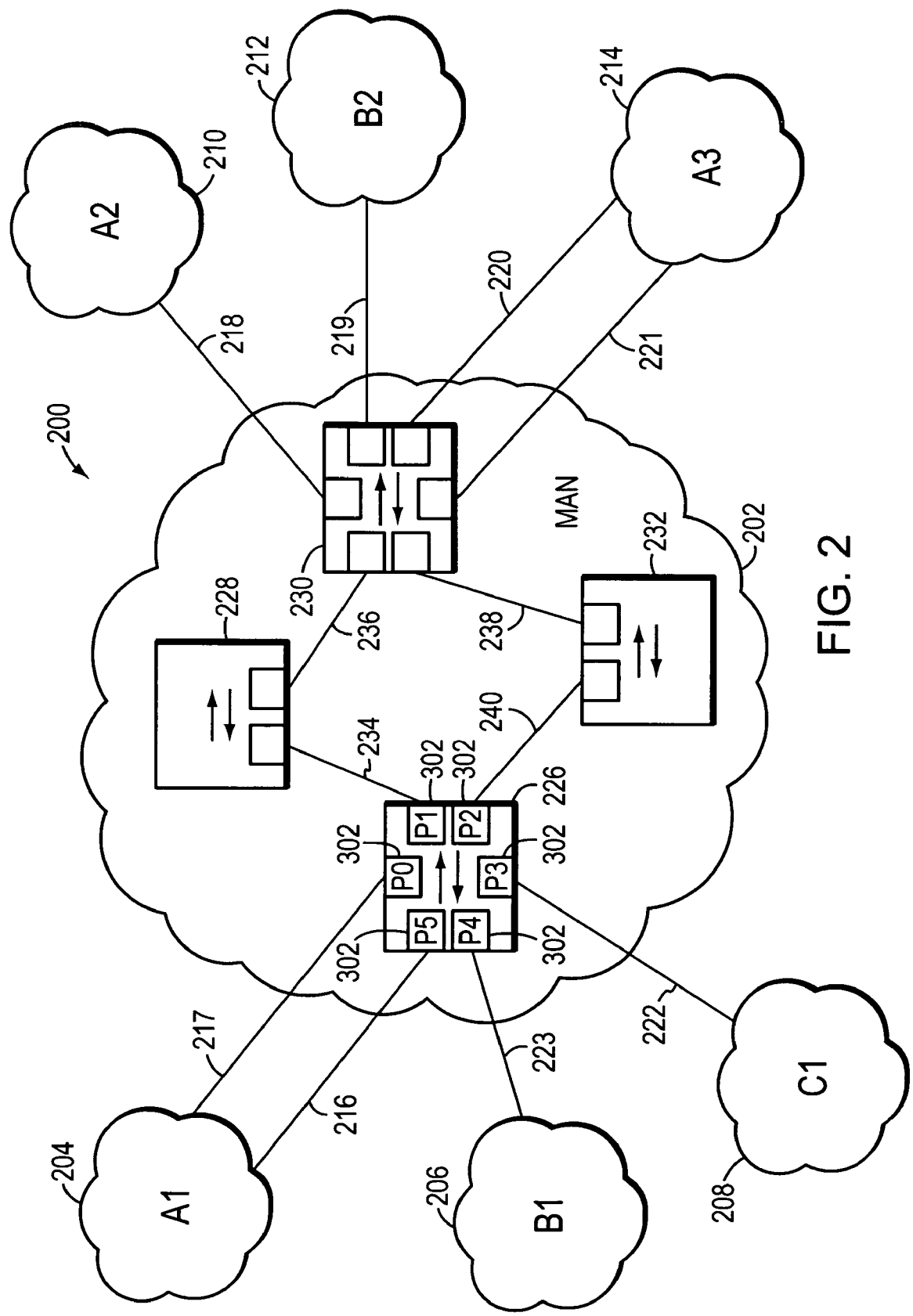
FIG. 2 is a highly schematic diagram of a computer network.

FIG. 2 is a highly schematic illustration of a computer network 200. Computer network 200 includes a Metropolitan Area Network (MAN) 202 and a plurality of customer networks, such as customer networks 204-214. The MAN 202, which is also referred to as the provider network provides, among other things, interconnection services to the customer networks 204-214. In the illustrative embodiment, each customer network 204-214 comprises a plurality of entities or hosts, such as personal computers, workstations, servers, etc., which are all in the same general location, and are interconnected to form one or more Local Area Networks (LANs) so that the entities may source or sink data frames to one another. As used herein, the term "same general location" refers to a single building or a plurality of buildings on a single campus or within the area of roughly a single city block. The LANs of the customer networks 204-214 may be interconnected by one or more customer operated intermediate network devices, such as switches or bridges operating at Layer 2 (L2) of a communications stack.

Customer networks 204-214 will typically belong to different organizations, such as organization A, organization B and organization C. In particular, organization A includes customer networks 204 (A1), 210 (A2) and 214 (A3). Organization B includes customer networks 206 (B1) and 212 (B2). Organization C includes customer network 208 (C1). Each customer network 204-214 is preferably coupled to the MAN 202 by a plurality of links, such as links 216-223. As mentioned above, a customer obtains various services from the MAN 202, such as interconnection services, so that the entities of a first customer network, e.g., customer network 204 (A1), can communicate with the entities of another customer network, e.g., customer network 214 (A3). Other services include providing customers with access to other networks, such as interconnecting customers with one or more Internet Service Providers (ISPs), and creating extranets that allow different customers to communicate with each other.

Those skilled in the art will recognize that the present invention can be used in other ways as well.

At least some of the customer networks may be organized into a plurality of Virtual Local Area Network (VLAN) segments as selected by the respective customer's network administrator. That is, network messages, such as frames, traversing each customer network may be tagged with VLAN designations. The frames may be tagged in accordance with the IEEE 802.1Q specification standard, which is hereby incorporated by reference in its entirety, and/or in accordance with the InterSwitch Link (ISL) protocol from Cisco Systems, Inc. as described in commonly owned U.S. Pat. No. 5,742,604, which is also hereby incorporated by reference in its entirety.

The MAN 202 comprises a plurality of interconnected intermediate network devices, such as bridges or switches 226-232. Specifically, the switches 226-232 may be interconnected by a plurality of provider links 234-240. Each switch, such as switch 226, moreover, includes a plurality of ports 302 for receiving and forwarding network messages. The ports 302 of each switch may be separately identified, e.g., Port 0 (P0), Port 1 (P1), Port 2 (P2), etc. In accordance with the present invention, those ports 302 of a provider switch that are coupled to customer networks, such as ports P0, P3, P4 and P5 at switch 226 which are coupled to customer networks 204, 208 and 206, are termed "customer boundary ports", while ports that are coupled to other devices within the MAN 202, such as ports P1 and P2 which are coupled to devices 228 and 232, are preferably termed "provider ports".

The computer network 200 of FIG. 2 is meant for illustration purposes only and is not meant to limit the invention. Indeed, the computer network 200 will typically include many more customer networks, perhaps many thousands, and other MANs.

Figure 3:
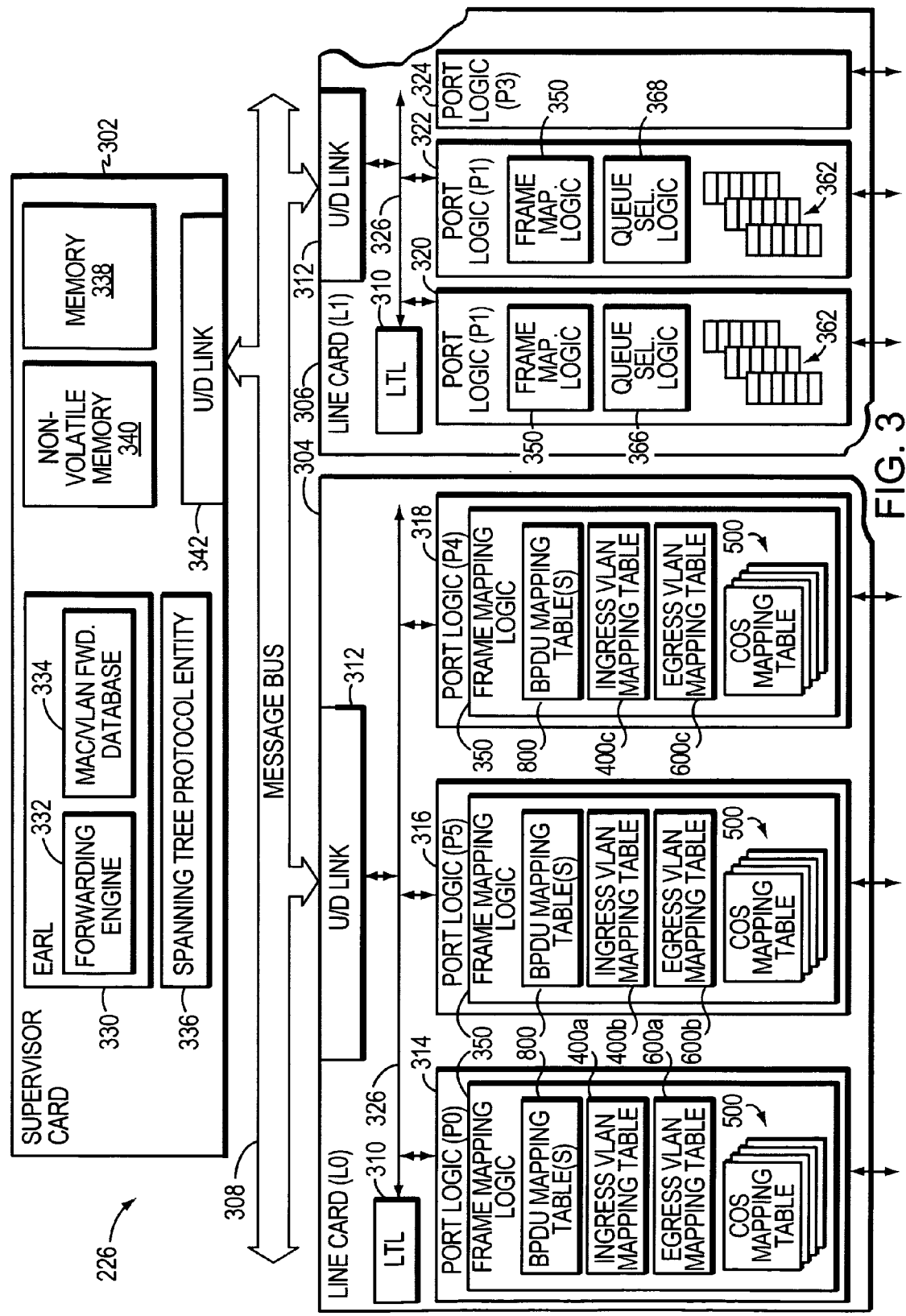
FIG. 3 is a highly schematic, partial functional diagram of an intermediate network device of the computer network of FIG. 2.

FIG. 3 is a partial functional diagram of a switch of the MAN 202, such as switch 226. Switch 226 preferably includes a supervisor card 302 and a plurality of line cards or modules 304 and 306 (e.g., line cards 0 and 1). Supervisor card 302 and line cards 304 and 306 are interconnected by a high-speed message bus 308. Each line card 304 and 306, moreover, has a local target logic (LTL) memory 310, an up/down link (U/D link) interface circuit 312, and a plurality of port logic circuits, such as port logic circuits 314, 316 and 318 at line card 304, and port logic circuits 320, 322 and 324 at line card 306. Each port logic circuit defines or establishes a physical port 302 (FIG. 2) for sending and receiving network messages to and from the computer network 200 (FIG. 2). Each line card 304 and 306 may include other components, such as a microprocessor, memories, etc. The port logic circuits of each line card are interconnected with each other and with the LTL 310 and U/D link 312 by a local bus 326 disposed on the respective line card.

Port logic circuits 314 (P0), 316 (P5), 318 (P4) and 324 (P3) may correspond to the customer boundary ports configured at switch 226, and port logic circuits 320 (P1) and 322 (P2) may correspond to the provider ports configured at switch 226.

The supervisor card 302 is configured and programmed to perform selected switch-wide functions, such as participating in and computing the active topology(ies) of at least the MAN 202 and making forwarding decisions for network messages that traverse more than one line card. In order to render such forwarding decisions, the supervisor card 302 preferably includes an encoded address recognition logic (EARL) circuit 330 that executes all forwarding decisions between the ports P of the line cards 304 and 306. To that end, the EARL circuit 330 contains a forwarding engine 332 and at least one Media Access Control (MAC)/VLAN forwarding database 334 configured to produce a unique destination port index value. The LTL memories 310 disposed on the line cards 304 and 306 implement "local" forwarding decisions, i.e., forwarding decisions among ports of the same line card.

The supervisor card 302 further includes a spanning tree protocol (STP) entity 336 that cooperates in the computation of one or more active topologies within at least the MAN 202. Supervisor card 302 may also include or have access to a main memory 338 and a non-volatile memory 340 for storing configuration and other parameters, including STP parameters. A U/D link 342 at the supervisor card 302 provides connectivity to the message bus 308.

High-speed message bus 308 is preferably a switching matrix employed to control the transfer of data among the various cards 302, 304 and 306 plugged into the switch 226. The U/D link 312 of each line card basically interfaces between the local bus 326 and the message bus 308. Inputs to the various LTL memories 310 may be received over the respective local buses 326, which are driven by the corresponding U/D links 312. Switch 226 also includes a common bus (not shown) that similarly interconnects the line cards 304 and 306 and supervisor card 302 to support out-of-band communication among the cards 302, 304 and 306.

It should be understood that the supervisor card 302 may include other components, such as a network management processor(s) for running various protocols, its own port logic circuits (P), local target logic (LTL) memory and local bus.

Suitable intermediate network device platforms for use with the present invention include the commercially available Catalyst 4000 and 6000 series of switches from Cisco Systems, Inc. of San Jose, Calif.

In accordance with the present invention, each port preferably includes frame mapping logic 350 for processing frames received at the respective port. Specifically, the frame mapping logic 350, if enabled, selects a provider VLAN designation and a provider CoS value for association with each frame received at the respective customer boundary port. Each frame mapping logic circuit 350 includes or otherwise has access to an Ingress VLAN mapping table 400 and a plurality of CoS mapping tables 500 for use in deriving the appropriate provider VLAN designation and the appropriate provider CoS value that are to be associated with the received frame. In the preferred embodiment, a separate Ingress VLAN mapping table 400 and the same or a separate set of CoS mapping tables 500 are provided at each port logic circuit 314, 316, 318, 320, 322 and 324. For example, the frame mapping logic 350 at port P0 may include Ingress VLAN mapping table 400a, the frame mapping logic 350 at port P5 may include Ingress VLAN mapping table 400b, and so on.

Each frame mapping logic 350 further includes an Egress VLAN mapping table 600 and one or more Bridge Protocol Data Unit (BPDU) mapping tables 800. As with the Ingress VLAN mapping tables 400a-c, each port is preferably configured with a different Egress VLAN mapping table 600.

In addition, each port, including those ports acting as provider ports, such as ports P1 and P2, may also include a plurality of transmission queues, which are designated generally by reference numeral 362 at port P1 and by reference numeral 364 at port P2. Each port, including provider ports P1 and P2, may further include queue selector logic 366 and 368 that is operably coupled to the respective transmission queues 362 and 364. As described herein, each individual transmission queue is configured to buffer network messages or frames for forwarding by the respective port. The selection of a particular queue depends on the frame's CoS value; specifically, its provider CoS value. There may be, for example, a separate transmission queue for each CoS value, or frames associated with multiple CoS values may be placed in the same queue. The queue selector logic 366 and 368 may also be configured or programmed to implement a known congestion avoidance strategy or algorithm, such as weighted fair queuing (WFQ), random early detection (RED), weighted random early detection (WRED), etc.

In the preferred embodiment, the frame mapping logic 350 is implemented in hardware through a plurality of registers and combinational logic configured to produce sequential logic circuits and cooperating state machines, such as through one or more specially designed Application Specific Integrated Circuits (ASICs), or Field Programmable Gate Arrays (FPGAs) and/or Content Addressable Memories (CAMs), among other devices. Alternatively, the frame mapping logic 350 may be implemented through one or more software modules or libraries containing program instructions pertaining to the methods described herein and executable by one or more processing elements, such as a microprocessor disposed at the port or line card or a network processor disposed at the supervisor card. The software modules or libraries may be stored and/or executed on any computer readable media. Nonetheless, those skilled in the art will recognize that various combinations of software and hardware, including firmware, may be utilized to implement the present invention.

It should be understood that the line cards 304 and 306 and/or port logic circuits 314-324 may include other components. For example, each port logic circuit 314-324 preferably includes a Color Blocking Logic circuit (not shown) as described in commonly owned U.S. Pat. No. 5,764,636 titled Color Blocking Logic Mechanism for High-Performance Switch, which is hereby incorporated by reference in its entirety. Each port may also have a plurality of queues or buffers to store messages to be transmitted on the message bus 308 and a queue selector to select among these buffers.

It should be further understood that each port preferably includes all of the described functionality. However, depending on the port's function or role some of the functionality, such as deriving provider VLAN and provider CoS values, may be disabled by management action.

FIG. 4 is a highly schematic illustration of the Ingress VLAN mapping table 400c configured at port P4 of switch 226. Table 400c is preferably organized at least logically as a table or array having a plurality of columns and rows whose intersections define records or cells for storing information. In particular, table 400c has a customer VLAN column 402, a provider VLAN column 404, a CoS Table Index column 406, a Remove Customer VLAN column 408 and a BPDU column 410 and a plurality of rows 412a-h. For each row, there is a customer VLAN designation stored in the cell of column 402, a provider VLAN designation stored in the cell of provider VLAN column 404, a CoS Table Index value stored in column 406, a flag stored in Remove Customer VLAN column 408 and a flag stored in BPDU column 410. By populating the rows 406a-h of table 400, a network administrator can associate or map one or more customer VLAN designations to a chosen or desired provider VLAN designation, CoS table index, remove Customer VLAN flag and BPDU flag. Furthermore, because each port preferably has its own Ingress VLAN mapping table 400, the association of customer VLAN designations to provider VLAN designations, CoS table indices, remove Customer VLAN flags and BPDU flags can be varied on a port-by-port basis within a given switch and thus between various switches. That is, Ingress VLAN mapping table 400c at port P4 may have a first set of mappings, while Ingress VLAN mapping table 400a at port P0 may have a second set of mappings that differs from the first set.

Ingress VLAN mapping table 400c, which controls the association of provider VLANs and identifies the appropriate CoS mapping tables for frames received at port P4, for example, maps received frames tagged with customer VLAN designation "10" to provider VLAN designation "16" and frames tagged with customer VLAN designations "11" or "12" with provider VLAN designation "10". Incoming frames tagged with customer VLAN designations "20", "21" or "22" are all associated with provider VLAN designation "11". As set forth in rows 406g and 406h, incoming frames tagged with no VLAN designation, e.g., conventional Ethernet frames, and incoming frames tagged with any customer VLAN designation other than those set forth in rows 406a-f are associated with provider VLAN designation "12". Furthermore, incoming frames tagged with customer VLAN "10" are mapped to the CoS Mapping Table corresponding to index "2", frames tagged with customer VLAN "11" are mapped to the CoS Mapping Table corresponding to index "1" and so on.

A "tagged frame" refers to a network message, such as frame 100 (FIG. 1), having a tag header 112, and a carrying a VLAN designation in VID field 122. Alternatively, a tagged frame may correspond to the ISL frame format from Cisco Systems, Inc.

As shown, with the present invention, different provider VLAN designations can be associated with different network messages received at a given customer boundary port depending on the customer VLAN designation with which the received message has already been tagged. Furthermore, multiple customer VLAN designations, e.g., customer VLAN designations "11" and "12", can be associated with the same provider VLAN designation, e.g., provider VLAN designation "10". Meanwhile, at port P5 which is coupled to customer network 204 (A1), customer VLAN designations "10", "11" and "12" may all be mapped to provider VLAN designation "32".

Figure 1:
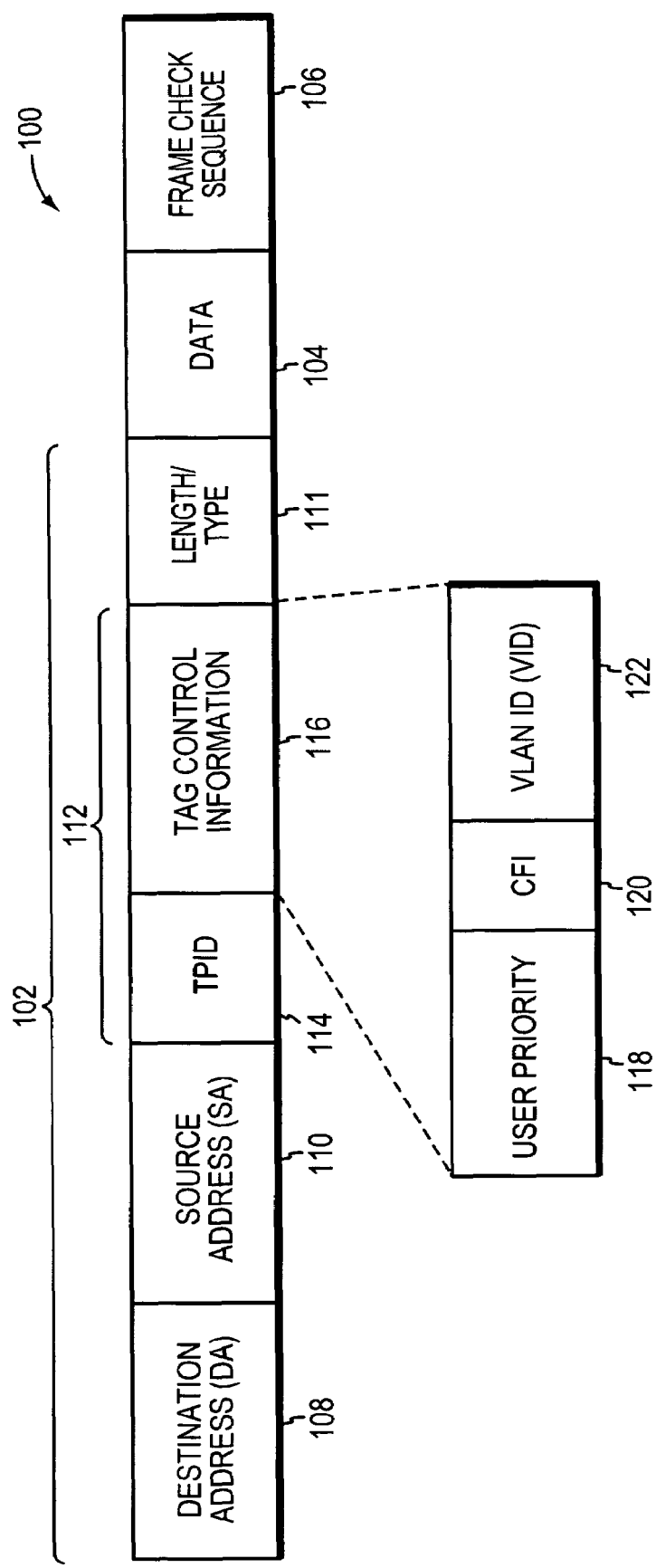
FIG. 1, previously discussed, is a block diagram of a prior art frame.
Figure 5:
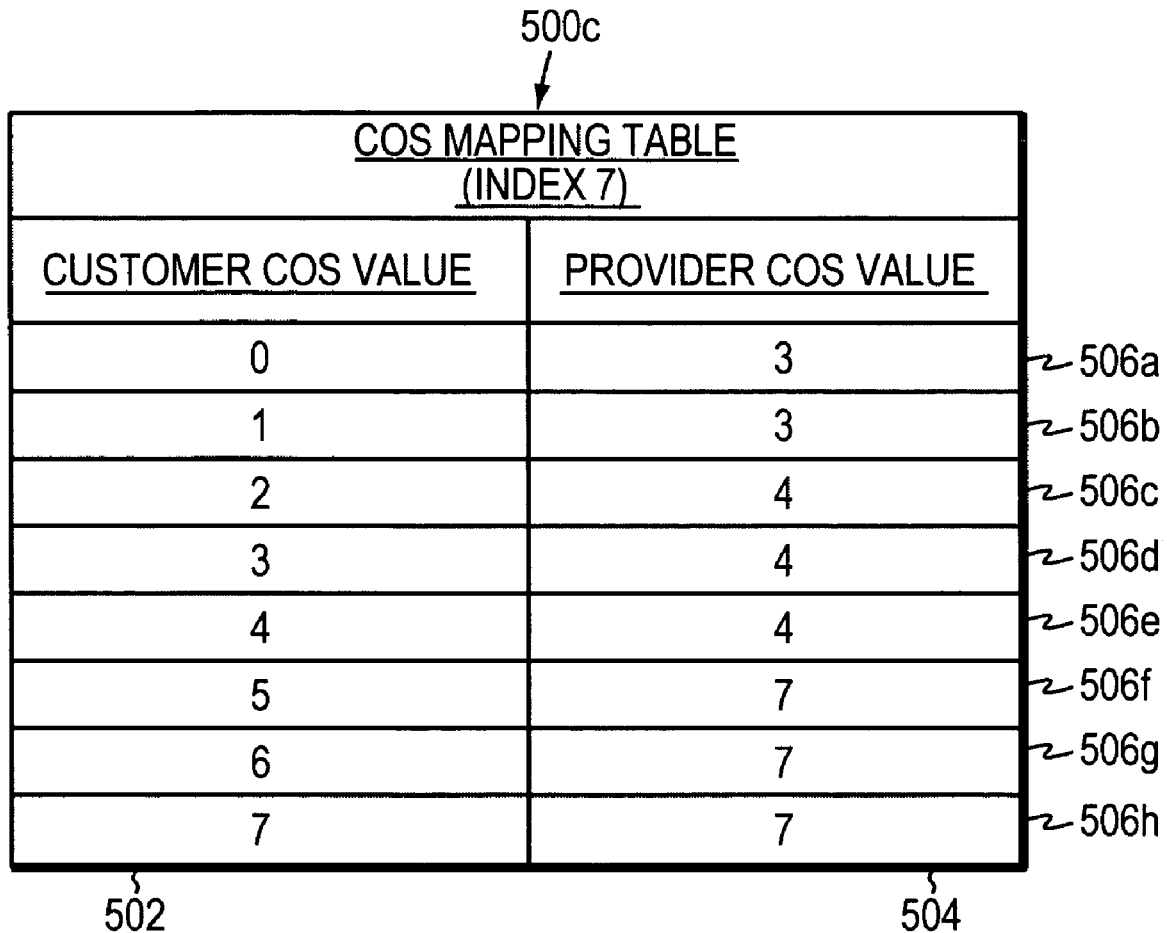

FIG. 5 is a highly schematic illustration of Ingress CoS mapping table 500c having index value "7" configured at port P4 of switch 226. Table 500c is preferably organized at least logically as a table or array having a plurality of columns and rows whose intersections define records or cells for storing information. In particular, table 500c has a customer CoS value column 502, a provider CoS value column 506 and a plurality of rows 506a-h. Each row of table 500c maps a received frame to a provider CoS value based on the received frame's CoS value as set forth in its user_priority field 118 (FIG. 1). The particular CoS Table 500 that is selected for deriving the provider CoS value is identified by the index specified in column 406 of the Ingress VLAN mapping table 400. By populating the rows 506a-h, a network administrator can associate or map various customer CoS values to chosen or desired provider CoS values. Furthermore, because each port preferably has its own mapping of customer VLANs to CoS table indices, the association of customer CoS values to provider CoS values can be varied on a port-by-port basis within the MAN 202.

FIG. 6 is a highly schematic illustration of the Egress VLAN mapping table 600d configured at port P2 of switch 226. Table 600d is preferably organized at least logically as a table or array having a plurality of columns and rows whose intersections define records or cells for storing information. In particular, table 600d has a provider VLAN column 602, an add VLAN column 604, a provider VLAN column 606, a CoS table index column 608, and a plurality of rows 610a-g. In each row, there is a provider VLAN in the cell corresponding to column 602, an add VLAN flag in the cell corresponding to column 604 and a CoS table index value in the cell corresponding to column 608. There may also be a particular VLAN designation in the cell corresponding to the provider VLAN column 606 depending on the setting of the flag in the add VLAN column 604. FIG. 6 basically illustrates an Egress mapping table for use by a trunk port whose native VLAN is "15".

It should be understood that the contents of tables 400c 500c and 600d are for illustrations purposes only and that, in operation, the tables may be programmed differently depending on the functions to be performed by the respective ports. The contents of the tables may also be modified and/or labeled or described differently. For example, for a port that faces part of the provider network, rather than a customer network, the customer VLAN column 402 of the Ingress VLAN Mapping table 400, assuming table 400 were enabled on such a port, would more accurately be called frame (or provider) VLAN column. Frames within the provider network may no longer have a customer VLAN. Furthermore, for a port facing a customer network, rather than the provider network, the provider VLAN column 606 of the Egress VLAN Mapping table 600 would more accurately be called customer VLAN, as it is a customer VLAN being added to the frame by such a port (assuming the respective add VLAN cell is set). Those skilled in the art will recognize that other changes or modifications can be made.

Operation of the Present Invention

Suppose a network entity disposed in customer network 206 (B1) generates a network message to be delivered to a network entity disposed in customer network 212 (B2) both of which correspond to organization B. The source entity preferably encapsulates the message in one or more untagged Ethernet frames. In the frame's DA field, the source entity in customer network 206 loads the MAC address of the target entity in customer network 212. In the frame's SA field, the source entity loads its own MAC address. Within customer network 206, the Ethernet frame is tagged with a customer VLAN designation typically by the first switch or bridge to receive the frame. The frame may be tagged in accordance with the ISL frame format from Cisco Systems Inc. or with the IEEE 802.1Q specification standard format or in accordance with some other VLAN frame format. Suppose the Ethernet frame is tagged in accordance with the IEEE 802.1Q specification standard by inserting a tag header 112 following the source address field 110 as shown in FIG. 1. In particular, the bridge or switch within the customer network 206 that first receives the frame loads a VLAN designation, such as "20" into the VID field 122. The bridge or switch in customer network 206 may also load a CoS value, such as "3", into the frame's user_priority field 118. It should be understood that the VLAN designation selected by the bridge or switch, i.e., VLAN designation "20" is typically determined solely as a function of the particular port on which the untagged frame is received from the source entity.

In accordance with the present invention, this VLAN designation and CoS value are the "customer" VLAN designation and "customer" CoS value.

The VLAN tagged frame is then routed through customer network 206, and is forwarded to the MAN 202, which provides connectivity between customer networks 206 and 212. It should be understood that the tagged frame may be converted from IEEE 802.1Q format to ISL format one or more times as it traverses customer network 206, depending on the manner by which the links within customer network 206 have been configured.

Suppose, the VLAN tagged frame is received at customer boundary port P4 of switch 226 in MAN 202. The VLAN tagged frame is captured by the port logic circuit 318 of port P4. In accordance with the present invention, the frame mapping logic 350 first determines whether the frame is tagged with a customer VLAN. If not, the frame mapping logic preferably accesses a Default frame VLAN table (not shown) to derive a default "customer" VLAN and a default "customer" CoS value for the frame. The frame mapping logic 350 then retrieves the frame's customer VLAN designation, i.e., "20", from VID field 122 (or the derived default "customer" VLAN in the case of an untagged frame). The frame mapping logic 350 also retrieves the frame's customer CoS value, i.e., "3", from user_priority field 118 (or the derived default "customer" CoS value). Based on the retrieved customer VLAN designation, the frame mapping logic derives a provider VLAN designation, a CoS table index value, and an Ingress VLAN BPDU flag state for the received frame. To derive this information, the frame mapping logic 350 at port P4 preferably performs a look-up on its Ingress VLAN mapping table 400c (FIG. 4) using the retrieved customer VLAN designation. As indicated by row 412d of the Ingress VLAN mapping table 400c, customer VLAN "20" maps to provider VLAN "11", CoS table index "7", and an Ingress VLAN BPDU flag state of "No".

The frame mapping logic 350 next derives the appropriate provider CoS value to be associated with the received frame. To derive the appropriate provider CoS value, the frame mapping logic 350 performs a look-up on the particular CoS mapping table identified by the CoS table index value from matching row 412d (FIG. 4), i.e., the CoS mapping table corresponding to index "7", namely table 500c (FIG. 5). As indicated by row 506d of the Ingress CoS mapping table 500c, customer CoS value "3" maps to provider CoS value "4". As described below, the frame mapping logic then determines whether the received frame is a BPDU message.

Suppose the frame does not corresponds to a BPDU message. Frame mapping logic 350 at port P4 then drives the message onto the switch's message bus 308. Rather than replace the customer VLAN designation and customer CoS value with the derived provider VLAN designation and provider CoS value, the frame mapping logic 350 is preferably configured to generate a separate bus header, such as a data bus (DBus) header, for the frame containing the derived provider VLAN, provider CoS value, and Ingress VLAN BPDU flag state. The DBus header, which may include additional information, such as destination address, may be appended to the frame 100 as originally received.

The original frame 100 and DBus header are then driven onto the switch's highspeed message bus 308 via local bus 326 and U/D link 312 for receipt by the supervisor card 302. At the supervisor card 302, the forwarding engine 332 preferably utilizes the contents of the frame's destination address field 108 and its provider VLAN to perform a look-up on the forwarding database 334 to derive or identify the outbound port(s) from which the frame 600 is to be forwarded. The forwarding engine 332 may also learn the frame's source address by storing it in the forwarding database 334. Suppose the forwarding engine 332 determines that the frame is to be forwarded from port P2. The forwarding engine 332 preferably instructs port logic circuit 322 which corresponds to port P2 to forward the frame. The forwarding engine 332 also sends the frame and the DBus header to port P2. Alternatively, each port, including port P2, may receive the frame and DBus header from the message bus 308 at the same time as the supervisor card 302.

The frame mapping logic 350 at port P2 accesses its Egress VLAN table 600d to determine whether a provider VLAN and provider CoS value should be appended to the frame 100 prior to forwarding from port P2 and, if so, what those values should be. Specifically, the frame mapping logic 350 performs a look-up on its Egress VLAN table 600d (FIG. 6) using the provider VLAN that has been associated with the frame, i.e., VLAN "11". Provider VLAN "11" corresponds to row 610b which indicates, at column 604, that a VLAN should be added to the frame prior to forwarding. The cell of row 610b corresponding to column 606 specifies the particular provider VLAN that is to be appended to the frame, i.e., "11".

It should be understood that by including a separate Provider VLAN to be added column 606, the present invention can be configured to add a different provider VLAN from the one associated with the frame 100 by the Ingress VLAN mapping table upon the frame's receipt by the switch 226. Row 610e of Egress VLAN mapping table 600d, for example, indicates that frames associated with provider VLAN "14" should nonetheless be forwarded by port P2 with provider VLAN "13" appended to them. In addition, if the add VLAN entry 604 of a given row of the Egress VLAN mapping table 600d is set to No, then no provider VLAN is to be appended to the frame prior to forwarding. Row 610f, for example, indicates that frames associated with provider VLAN "15" should not have any provider VLAN appended to them prior to forwarding.

Each row 610 of the Egress VLAN mapping table 600 may also identify a particular CoS mapping table in the cells corresponding to column 608. Row 610b, for example, specifies CoS mapping table "7". Accordingly, the frame mapping logic 350 at port P2 accesses the CoS mapping table matching index value "7". The frame mapping logic 350 accesses this particular CoS mapping table and, using the frame's customer CoS value, i.e., "3", derives a corresponding provider CoS value for the frame. Suppose the CoS mapping table at outbound port P2 identified by index value "7" maps customer CoS value "3" to provider CoS value "4".

It should be understood that, depending on the manner in which the Egress table 600 and CoS tables 500 at port P2 are programmed, this provider CoS value may be the same or may be different from the provider CoS value that was associated with the frame by inbound port P4. That is, the CoS mapping table at port P2 identified by index value "7" may contain the same or different mappings of customer CoS values to provider CoS values as the CoS mapping table identified by index value "7" at port P4.

Figure 7:
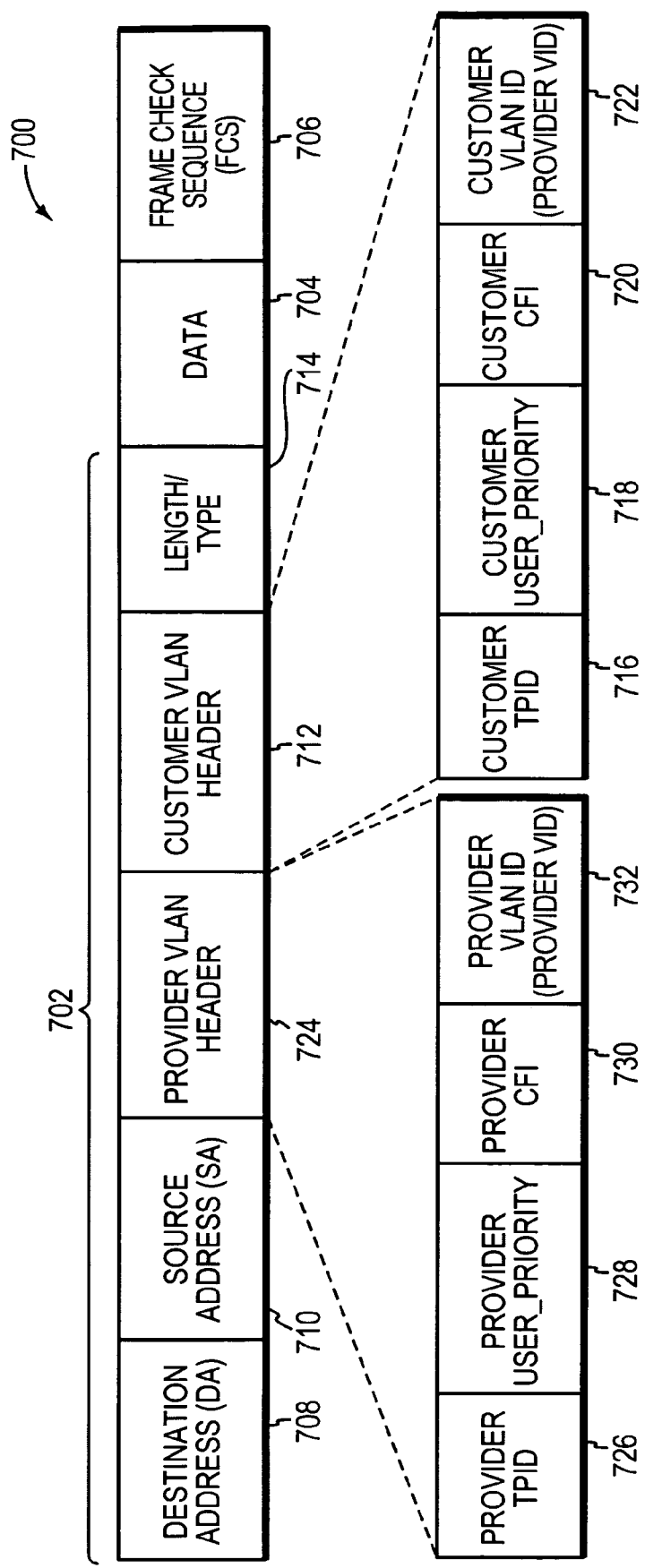
FIG. 7 is a highly schematic, partial block diagram of a network message in accordance with the present invention.

FIG. 7 is a highly schematic block diagram of a preferred format of a provider frame 700 which has a provider VLAN and a provider CoS value appended thereto. The provider frame 700 includes a header 702, a data field 704 and a frame check sequence (FCS) field 706. The header 702 includes a destination address (DA) field 708, a source address field 710, a customer VLAN header field 712 and a length/type field 714. Header fields 708, 710, and 712, and data field 704 contain the same information as the respective fields of the originally received frame 100 (FIG. 1). In particular, the customer VLAN header field 712 includes a customer TPID field 716, a customer user_priority field 718, a customer Canonical Format Indicator (CFI) field 720 and a customer VLAN ID (customer VID) field 722 that contain the same information as in fields 114, 118, 120 and 122 (FIG. 1) of the originally received frame.

Also included within the provider frame's header 702 is a provider VLAN header 724 that, in turn, includes a provider TPID field 726, a provider user_priority field 728, a provider CFI field 730, and a provider VLAN ID (provider VID) field 732. The provider VLAN header 724 may also be configured to include one or more flags (not shown).

The values contained in the length/type and FCS fields 714 and 706 are typically recalculated prior to forwarding the provider frame 700.

In the illustrative embodiment, the provider TPID field 726 is 16-bits, the provider user_priority field 728 is 3-bits, the provider CFI field 730 is 1-bit, and the provider VID field 732 is 12-bits.

The frame mapping logic 350 preferably loads the derived provider CoS value, i.e., "4", in the provider user_priority field 728. The provider CFI field 730 is preferably set to indicate whether the bit order of the provider VID field 732 is canonical or non-canonical. In the provider VID field 732, the frame mapping logic 350 preferably loads the derived provider VLAN designation, i.e., "11". The provider TPID field 726 is preferably set to a value different from that specified by the IEEE 802.1Q specification standard so as to distinguish the provider frame from an 802.1Q frame and to identify it as a provider frame.

It should be understood that the provider VLAN header 724 may take other forms and/or may be appended to the frame at other locations. For example, the provider CFI field 730 could be omitted.

Once the provider frame 700 has been generated, as called for by the matching row 610b of the Egress VLAN mapping table 600d at the outbound port P2, it is buffered at a selected transmission queue 364. The particular transmission queue is selected based upon the provider CoS value, i.e., "4", entered into the frame's provider user_Priority field 728. That is, the transmission queue is selected based upon the provider CoS value as derived by the outbound port P2 through its Egress VLAN mapping table and respective CoS mapping tables. The frame's original, i.e., customer, CoS value, as contained in the user_priority field 118 (FIG. 1), is preferably not utilized by the outbound port P2 in selecting the appropriate transmission queue for buffering the provider frame 602.

In addition, the color blocking logic at port P2 determines whether the provider frame 700 can be forwarded from outbound port P2. Specifically, the color blocking logic determines whether outbound port P2 is in the forwarding spanning tree state for the provider VLAN designation with which the frame has been associated as determined by the Egress VLAN mapping table 600 at the outbound port P2. Here, the frame is associated with provider VLAN "11". Suppose that port P2 is in the forwarding state for VLAN "11", thereby permitting the provider frame 700 to be forwarded from port P2. If port P2 were in the blocking spanning tree state for VLAN "11", then the Color Blocking Logic would prevent the provider frame 700 from being transmitted from port P2. The frame's customer VLAN designation as contained in customer VID field 722 is preferably not utilized by the Color Blocking Logic circuit at port P2 in determining whether or not the provider frame 700 may be forwarded form outbound port P2. In other words, a provider frame may be forwarded from a given outbound port even if the port is in the blocking spanning tree state for the VLAN designation contained in the frame's customer VIED field 722, i.e., the frame's original VLAN designation (so long as the port is forwarding for the frame's provider VLAN designation).

When the provider frame 700 reaches the head of its respective transmission queue and the queue selector logic 368 activates that transmission queue, the provider frame 700 is forwarded from outbound port P2 of switch 226. That is, the provider frame 700 is driven onto link 240 and received at switch 232 of the MAN 202. Because a provider VLAN designation and a provider CoS value have already been associated with and appended to the provider frame 700, switch 232 need not recompute or re-determine these values. Indeed, the frame mapping logic circuit of this port of switch 232 may be disabled. Switch 232 preferably utilizes the frame's destination address as contained in DA field 708 and its provider VLAN as contained in provider VID field 732 to identify the outbound port(s) from which the frame is to be transmitted by switch 232. Each outbound port may utilize the frame's provider CoS value as contained in provider user_priority field 728 to determine which particular transmission queue should be utilized to buffer the provider frame 700. In addition, the Color Blocking Logic at each outbound port utilizes the frame's provider VLAN designation as contained in provider VID field 732 in cooperation with the port's spanning tree states to determine whether or not the provider frame 700 can be forwarded from the respective outbound port.

This process is repeated at the other switches within the MAN 202.

At switch 230, the forwarding engine determines that the provider frame 700 should be transmitted from the port coupled to customer network 212. In this case, the Egress VLAN mapping table at the outbound port of switch 230 coupled to customer network 212 is programmed to indicate whether a customer VLAN should be appended to the frame prior to forwarding the frame into the customer network. The outbound port utilizes the provider VLAN with which the frame is associated as an index into its Egress VLAN Mapping table. For example, if the cell corresponding to column 604 of the matching table entry, such as row 610f, is set to No, then a VLAN header is not appended to the frame. This will typically be the case where the frame still has its original customer VLAN. The matching table entry may nonetheless specify a CoS table index value at the cell corresponding to column 608. If it does, the frame mapping logic 350 accesses this CoS table and, using the frame's customer CoS value, derives a provider CoS value. This provider CoS value may be utilized in selecting the appropriate transmission queue for buffering the frame prior to transmission.

In determining whether the frame 100 is to be forwarded, the Color Blocking Logic at the outbound port at switch 230 utilizes the provider VLAN internally associated with the frame. Switch 230 then transmits the original frame 100 into customer network 212 (B2).

The intermediate network devices within customer network 212 use the customer VLAN designation of VID field 122 and the customer CoS value of user_Priority field 118 in forwarding the frame to the destination entity.

As shown, the frame mapping logic 350 of the present invention maps each received frame to a provider VLAN designation based upon the received frame's customer VLAN designation and the particular inbound port on which the frame is received. This provider VLAN designation is then preferably utilized in forwarding the frame through the provider network, i.e., MAN 202. Similarly, each received frame is mapped to a provider CoS value based on the received frame's customer CoS value, customer VLAN designation and the port on which the frame is received. Within the provider network, moreover, the intermediate network devices preferably utilize the assigned provider VLAN designation and provider CoS value in routing or forwarding the frame.

Furthermore, the addition of an Egress VLAN mapping table permits a customer VLAN and a customer CoS value to be derived and appended to the frame prior to forwarding the frame into a customer network.

In addition, the provider VLAN designation and/or provider CoS that are appended to the frame may be recalculated at each (or at least at more than one) intermediate network device within the provider network, i.e., MAN 202. Similarly, each intermediate network device within the MAN 202 could derive a different provider VLAN and/or provider CoS for use in processing the frame internally and yet append the same provider VLAN and provider CoS value prior to forwarding the frame. Each (or more than one) intermediate network device disposed within MAN 202 could forward the frame without any provider VLAN header 724. Indeed, the table arrangement of the present invention gives network administrations a high degree of flexibility in implementing different mapping paradigms to achieve different goals and/or provide different services by the MAN 202.

It should be understood that header 702 could also be translated into other Layer 2 (L2) headers, such as Multi-Protocol Label Switching (MPLS), Virtual Channel (VC), Frame Relay, etc. This could be advantageous where the MAN 202 is divided into multiple provider networks that are interconnected by an interconnect fabric operating at Layer 3 (L3) or higher, such as the well-known Internet. The customer frame, which consists of the header 102 and data field 104 would nonetheless remain intact. That is, these fields would remain unmodified.

It should be further understood that rather than having a separate Ingress VLAN mapping table 400, separate CoS mapping tables 400 and a separate Egress VLAN mapping table 700 at each port, a provider switch may include one (or more than one) Ingress VLAN mapping table 400, one (or more than one) CoS mappings table 500 and one (or more than one) Egress VLAN mapping table that are accessed by multiple ports. In this case, the tables 400, 500 and 700 may have sections set aside for each port.

Those skilled in the art will recognize that other alternatives are also possible. For example, the CoS Mapping Tables may be omitted and their information merged into the Ingress and Egress VLAN mapping tables.

In addition, the present invention may be used on links configured in accordance with the other VLAN tagging schemes, such as the InsterSwitch Link (ISL) protocol from Cisco Systems, Inc. That is, a provider VLAN header may be added to ISL formatted frames.

Tunneling Customer BPDU Messages

In a further aspect, the present invention tunnels configuration bridge protocol data unit (BPDU) messages from the customer networks across the MAN 202 unmodified. MAN 202 does not cooperate with the individual customer networks 204-214 in computing a single active topology for network 200. Instead, bridges 226-232 compute one or more separate active topology(ies) within MAN 202 preferably utilizing the Multiple Spanning Tree Protocol (MSTP) as described in the IEEE Draft 802.1s/D13 specification standard, which is hereby incorporated by reference in its entirety. BPDU messages generated by the intermediate network devices within the customer networks of a given organization are preferably tunneled through MAN 202 and passed into the other computer networks of the given organization.

In the illustrative embodiment, this objective is achieved by utilizing the mapping tables to classify received frames into one of three possible types: data frames, provider BPDU messages or customer BPDU messages. Each type of frame, moreover, is treated slightly differently by the switch. Specifically, data frames are forwarded by the switch, and the source addresses are stored in the switch's forwarding database 334, i.e., the source addresses are learned. Data frames are also subject to the color blocking logic at both the inbound port and the identified outbound port(s). Provider BPDU messages are not subject to the color blocking logic at the inbound port. They are sent to the spanning tree protocol entity 336 and used in the computation of the one or more active topologies being calculated by the switch. The source addresses of provider BPDU messages are not learned, and provider BPDU messages are not forwarded by the switch. Customer BPDU messages, on the other hand, are not sent to the spanning tree protocol entity 336, i.e., they are not utilized in the switch's execution of the spanning tree protocol. They are forwarded, but their source addresses are not learned. Customer BPDU messages are also subject to the color blocking logic at both the inbound and outbound ports. In addition, the destination MAC address of customer BPDU messages are preferably translated into a selected multicast address so that they can be "tunneled" through the MAN 202.

In the illustrative embodiment, the present invention achieves these objectives by utilizing the BPDU tables 800 provided at each port. In the preferred embodiment, there are three BPDU tables per port: a BPDU Recognition and Translation table; an Ingress BPDU Classification and Translation table; and an Egress BPDU Classification and Translation table 800c. FIG. 8A is a highly schematic illustration of a BPDU Recognition and Translation table 800a, which is organized at least logically as an array having a plurality of columns and rows whose intersections define cells for storing information. Specifically, the BPDU Recognition and Translation table 800a has an Address Mask column 802, an Old Destination MAC Address column 804, a New Destination MAC Address column 806, a CoS Table Index column 808, and a plurality of rows 810a-h. The cells of the Address Mask column 802 contain masks to be applied to the corresponding addresses contained in columns 804 and 806 of the respective row. The cells of the Old Destination MAC Address column 804 are programmed to contain the bridge multicast destination addresses of BPDU messages that are expected to be received from the customer networks. The cells of the New Destination MAC Address column 806 are programmed to contain multicast addresses to which the bridge multicast destination addresses of received BPDU messages can be translated. The cells of the CoS table index column 808 are programmed to contain index values assigned to the CoS mapping tables at the respective port.

FIG. 8B is a highly schematic illustration of an Ingress BPDU Classification and Translation Table 800b, which is organized at least logically as an array having a plurality of columns and rows whose intersections define cells for storing information. Specifically, table 800b has a BPDU Found column 822, an Ingress VLAN BPDU flag column 824, a Translate column 826, an optional result column 828, and a plurality of rows 830a-c. The BPDU Found column 822 refers to whether a received frame is considered to be a BPDU by having matched a row 810 of table 800a. Accordingly, the cells of column 822 may be either asserted, e.g., set to Yes, or de-asserted, e.g., set to No. The Ingress VLAN BPDU flag column 824 refers to the state of the Ingress VLAN BPDU flag as specified by column 410 of the matching row 412 of the Ingress VLAN Mapping table 400 for a received frame. Accordingly, the cells of column 824 may also be either asserted or de-asserted. The Translate column 826 is programmed to specify whether or not the destination MAC address of a received frame, meeting the conditions specified in columns 822 and 824 for the respective row, should be translated.

FIG. 8C is a highly schematic illustration of an Egress BPDU Classification and Translation Table 800c, which is organized at least logically as an array having a plurality of columns and rows whose intersections define cells for storing information. Specifically, table 800c has an Egress BPDU found column 842, a Translate column 844 an optional result column 846 and a plurality of rows 848a-b. The Egress BPDU found column refers to whether a frame to be forwarded from the respective port is considered to be a BPDU by having matched a row 810 of table 800a. Accordingly, the cells of column 842 may be either asserted, e.g., set to Yes, or de-asserted, e.g., set to No. The Translate column 844 is programmed to specify whether or not the destination MAC address of a frame to be forwarded, meeting the conditions specified in column 842 for the respective row, should be translated.

As described above, upon receipt of a frame at a given port (P), the frame mapping logic 350 first determines whether the received frame is untagged. If so, the frame mapping logic may access a Default frame VLAN table to derive a default "customer" VLAN and a default "customer" CoS value for association with the frame. Next, the frame mapping logic performs a look-up on the port's Ingress VLAN mapping table 400 utilizing the frame's customer VLAN to derive a provider VLAN, a CoS table index value and a BPDU flag value. Suppose the Ingress VLAN BPDU flag of the matching row 412 of table 400 is asserted, e.g., is set to Yes. Next, the frame mapping logic accesses the identified CoS mapping table and derives a provider CoS value using the frame's customer CoS value as an index. The frame mapping logic 350 then performs a look-up in the port's BPDU Recognition and Translation Table 800a (FIG. 8A) using the frame's destination MAC address. That is, each mask of column 802 is applied to the frame's destination MAC address and the result is compared to the contents of corresponding cell of the Old Destination MAC Address column 804 to see whether there is a match to any of the rows 810a-h of table 800a. Suppose further the received frame matches or "hits" on a row, e.g., row 810c, of table 800a. In response, the frame mapping logic retrieves the New Destination MAC address stored at the cell of column 806 and the CoS table index value stored at the cell of column 808 corresponding to row 810c.

The frame mapping logic 350 then uses the results of the match/no match condition from the BPDU Recognition and Translation Table 800a, in this case a match which also referred to as a Yes condition, and the state of the BPDU flag from column 410 of table 400, in this case, Yes, as indices into the Ingress BPDU Classification and Translation Table 800b. This condition corresponds to row 830b, causing the frame mapping logic to classify the received frame as a customer BPDU and to translate its destination MAC address as specified by column 826. In particular, the frame mapping logic replaces the received frame's destination MAC address with the new Destination MAC address value retrieved from the matching row, i.e., row 810c, of table 800a. The frame mapping logic also accesses the CoS mapping table specified by the retrieved index from column 808 of table 800a and derives a provider CoS value for association with the customer BPDU. Next, the frame mapping logic 350 clears, e.g., de-asserts, a BPDU flag field included in the DBus header generated for the received frame, thereby causing the customer BPDU frame to by-pass switch's spanning tree protocol entity 336. Instead, the frame having the new Destination MAC address is sent to the switch's forwarding engine so that a forwarding decision may be rendered. The frame mapping logic 350 also asserts a "Don't Learn" flag field in DBus header, which prevents the EARL 330 from storing frame's source address in its filtering database, i.e., from learning the source address.

In the preferred embodiment, the New Destination MAC addresses are multicast addresses selected so that BPDU messages from a customer network that is part of a given organization are preferably forwarded from every port of the MAN 202 coupled to a customer network corresponding to the given organization (even back to the same customer network if there are more than one ports from the MAN 202 to that customer network). The New Destination MAC addresses are selected such that they are not recognized by the switches of MAN 202 as BPDU MAC addresses. Accordingly, within MAN 202, the translated customer BPDU messages are tunneled as though they were regular multicast messages.

If a received frame does not match any row 810 of table 800a, then the frame's BPDU Found state is no. In this case, the frame is classified as a data frame, as indicated by row 830a of table 800b regardless of the state of the Ingress VLAN BPDU flag corresponding to the frame, as indicated by the "X". Furthermore, if a received frame matches a row 810 of table 800a, but the Ingress VLAN BPDU flag as derived from the Ingress VLAN Mapping table 400 is No, then the received frame is classified as a provider BPDU, as indicated by row 830c of table 800b. In response, the frame is sent to the switch's spanning tree protocol entity 336 and its contents are used in the switch's execution of the spanning tree protocol.

It should be understood that by including the Ingress VLAN BPDU flag column 410 of table 400, then the BPDU messages associated with one or more customer VLANs can be tunneled while the BPDU messages associated with other customer VLANs are not tunneled.

Before forwarding a frame from a given outbound port, the frame mapping logic 350 preferably performs a look-up in the port's BPDU Recognition and Translation Table 800a (FIG. 8A) using the frame's destination MAC address. That is, each mask of column 802 is applied to the frame's destination MAC address and, this time, the result is compared to the contents of corresponding cell of the New Destination MAC Address column 804 to see whether there is a match to any of the rows 810a-h of table 800a. Suppose the frame to be forwarded matches or "hits" on a row, e.g., row 810d, of table 800a. In response, the frame mapping logic retrieves the Old Destination MAC address stored at the cell of column 804 corresponding to row 810d. The frame mapping logic 350 then uses the results of the match/no match condition from the BPDU Recognition and Translation Table 800*a*, in this case a match which is also referred to as a Yes condition, as an index into the Egress BPDU Classification and Translation Table 800*c*. This condition corresponds to row 848*b*, causing the frame mapping logic to translate the frame's destination MAC address as specified by column 844. Here, the frame mapping logic replaces the received frame's destination MAC address with the Old Destination MAC address value retrieved from the matching row, i.e., row 810*d*, of table 800*a*. In other words, the frame's original Destination MAC address is returned. The frame having the old Destination MAC address is then forwarded by the port.

It should be understood that the Egress BPDU Classification and Translation Table 800*c* is typically enabled only on ports facing a customer network. Similarly, the translation of customer BPDU messages preferably occurs at the edge or border of the MAN 2002. Within the MAN 202 customer BPDU messages whose addresses have been translated to multicast values are simply forwarded.

Those skilled in the art will recognize that the contents of tables 800*b* and/or 800*c* can be modified to implement other desired actions or results.

The flexible VLAN mapping tables of the present can also be programmed to allow MAN 202 to provide particular services, such as connecting a main customer network to a branch customer network, providing access between customer networks and one or more Internet Service Providers (ISPs), creating extranets for use by different customers, etc.

Connecting a Main Customer Network to a Branch Customer Network

Suppose that customer network 204 (A1) is a main customer network having many VLAN segments such that the network messages received at switch 226 are tagged with a customer VLAN. Suppose further that customer network 210 (A2) is a branch customer network, such that the entire customer network 210 is associated with a single VLAN, e.g., customer VLAN "10". Furthermore, suppose that the intermediate network devices disposed within customer network 210 (A2) are not configured to recognize or transport tagged frames. The tables of the present invention can be easily configured to support such an arrangement.

Specifically, the Ingress VLAN mapping tables 400 at ports P0 and P5 of switch 226 are configured to have an entry for messages tagged with customer VLAN "10" that causes the customer VLAN fields to be removed from those messages upon their entry into the MAN 202. This is done by asserting, e.g., setting to Yes, the Remove Customer VLAN cell of the respective entry, such as entry 412*a* (FIG. 4) which maps customer VLAN "10" to provider VLAN "15" and whose remove customer VLAN cell is set to Yes. Thus, when messages are received from customer network 204, the frame mapping logic 350 at ports P0 and P5 map those frames to provider VLAN 15 and utilize CoS mapping table "2" to derive the provider CoS value. The frame mapping logic 350 also removes customer VLAN fields 114, 118, 120 and 122 (FIG. 1) from the received frame and adds provider VLAN fields 726, 728, 730 and 732. The frame with the provider VLAN fields (but no customer VLAN fields) is forwarded through MAN 202 to switch 230 utilizing the provider VLAN and provider CoS value.

At switch 230, the respective Egress VLAN mapping table is configured to instruct the frame mapping logic to strip off the provider VLAN fields 726, 728, 730 and 732. Because the customer VLAN fields 114, 118, 120 and 122 were stripped off (back when the frame was first received at the MAN 202), when the provider VLAN fields are stripped off by switch 230, the frame is essentially converted to a standard, i.e., nontagged, frame format, such as conventional Ethernet. The untagged frame is then forwarded into customer network 210.

As shown, the MAN 202 can be used to take frames tagged with customer VLANs and to strip off those customer VLANs before forwarding the frames into a branch customer network that is not configured to recognize or transport tagged frames. Nonetheless, while the frames are being forwarded within the MAN 202 they are associated with a provider VLAN and a provider CoS value.

Switch 230, on the other hand, receives untagged frames from customer network 210 (A2) that are destined for other networks corresponding to organization A, such as customer network 204 (A1). The respective port of switch 230 is configured with a Default frame VLAN table and/or its ingress VLAN mapping table includes an entry, such as entry 412*g*, for mapping frames having no customer VLAN to a provider VLAN and a provider CoS value. Specifically, entry or row 412*g* maps untagged frames to provider VLAN "15" and uses CoS mapping table "4" to derive a provider CoS value for the frame while it is being forwarded within MAN 202.

Furthermore, if desired, the Egress VLAN mapping table at ports P0 and P5 of switch 226 can be configured to add customer VLAN fields to the frames received from customer network 210 (A2) before forwarding those frames into customer network 204 (A1). In particular, the Egress VLAN mapping tables of ports P0 and P5 at switch 226 can be configured to include a row, such as row 610*g*, that adds a VLAN to frames (originally received by the MAN 202 without any customer VLAN) before forwarding the frames out of the MAN 202 and into customer network 204 (A1). Row 610*g* specifies that frames associated with provider VLAN "16" (but having no customer VLAN fields) should have a VLAN added prior to forwarding. The VLAN to be added, moreover, is VLAN "10" the customer VLAN associated with frames from customer network 210 (A2). Switch 226 thus generates a frame having the format illustrated in FIG. 1. In the VID field 122, switch 226 enters VLAN "10". In the user_priority field 118, switch 226 enters a CoS value derived from CoS mapping table "4" as indicated by row 610*g* of the Egress VLAN mapping table 600*d*.

Providing Customers with Access to ISP(s)

Suppose customer A uses customer VLAN "30" to identify frames intended for a first ISP, e.g., ISP 1. Upon entry into the MAN 202, customer frames tagged with customer VLAN "30" are mapped to a selected provider VLAN, e.g., "100", that is assigned to ISP 1. If the ISP cannot handle VLAN tagged frames, the respective Ingress VLAN Mapping tables facing customer A are further configured to remove the customer VLAN tag. Such frames are forwarded through MAN 202 with just the provider VLAN "100". The Egress VLAN Mapping table of the port facing the ISP is programmed so that the ISP receives untagged frames. In the reverse direction, MAN 202 receives untagged frames from the ISP. The Ingress VLAN Mapping table may be configured to associate untagged frames with provider VLAN "100". The frames tagged with provider VLAN "100" are forwarded through MAN 202. The Egress VLAN Mapping table of the port facing the customer network maps frames tagged with provider VLAN "100" to an entry causing the frame mapping logic to add customer VLAN "30". Accordingly, before forwarding the frame into the customer network, a customer VLAN tag set to "30" is appended to the frame.

It should be understood that different customers using different customer VLANs 20 to access ISP 1 can nonetheless all be mapped to provider VLAN "100" within MAN 202. Thus, MAN 202 need only provide a single VLAN domain for ISP 1 even though many different customers are accessing ISP 1.

A given customer, moreover, may access many different ISPs. In this case, the customer can indicate which particular ISP it wants to access through the selection of a different customer VLAN. Each of these customer 25 VLANs may then be mapped to a different provider VLAN associated with the corresponding ISP.

Customer Extranet Access

As mentioned above, MAN 202 can be used to create one or more extranets that can be used by different customers to communicate with each other. Customer A, for example, may use customer VLAN "50" for traffic corresponding to Extranet 1, while customer B uses customer VLAN "60" for Extranet 1. The Ingress VLAN Mapping table disposed at the port of MAN 202 facing customer A's network may be programmed to map customer VLAN "50" to provider VLAN "200" and to cause the customer VLAN to be stripped off of the frame. The Egress VLAN Mapping table of the port facing customer B may be programmed to map provider VLAN "200" to customer VLAN "60" and to cause customer VLAN "60" to be added to frames prior to their being forwarded into customer B's network. In the reverse direction, frames received in MAN 202 from customer B tagged with customer VLAN "60" are mapped to provider VLAN "200", and have their customer VLAN tags removed. Before exiting MAN 202 and entering customer A's network, the frames associated with provider VLAN "200" are mapped to customer VLAN "50" and the respective Egress VLAN Mapping table is programmed to cause customer VLAN "50" to be added to the frame before transmission into customer network A.

Those skilled in the art will recognize that many other arrangements can be implemented by virtue of the highly flexible VLAN mapping tables of the present invention.

The addition of the VLAN Mapping tables of the present invention allows ports to operate differently from either the conventional access or trunk port functionality. Nonetheless, the tables can be programmed such that a port exhibits the behavior of a traditional access or trunk port.

The foregoing description has been directed to specific embodiments of this invention. It will be apparent, however, that other variations and modifications may be made to the described embodiments, with the attainment of some or all of their advantages. For example, the present invention can be utilized with computer networks running different types of LAN standards, such as Token Ring, Frame Relay, Wireless, etc. Therefore, it is an object of the appended claims to cover all such variations and modifications as come within the true spirit and scope of the invention.

What is claimed is:

1. An apparatus comprising:
a first port to provide connectivity to a customer network;
a second port to provide connectivity to a provider network;
a frame mapping logic associated with the first port, and operable to process a network message received at the first port, the received network message including a particular customer VLAN designation;
one or more Cost of Service (CoS) mapping data structures accessible to the frame mapping logic, each CoS mapping data structure to associate one or more customer CoS values with provider CoS values; and
a Virtual Local Area Network (VLAN) mapping data structure accessible to the frame mapping logic and operable to map one or more customer VLAN designations used in the customer network to provider VLAN designations used in the provider network and to an index value that identifies one of the CoS mapping data structures, wherein is the frame mapping logic is further operable to associate the received network message with a particular provider VLAN designation based upon the received network message's particular customer VLAN designation, and to access the identified CoS mapping data structure and to obtain therefrom a particular provider CoS value to associate with the received network message, and to pass the received network message toward the second port.

2. The apparatus of claim 1, wherein the frame mapping logic is further operable to associate the received network message with the particular provider VLAN designation by writing the particular provider VLAN designation to a field of the received network message, so that the received network massage includes both the particular customer VLAN designation and the particular provider VLAN designation.

3. The apparatus of claim 1, further comprising:
a forwarding engine operable to make a forwarding decision for the received network message based at least in part on the particular provider VLAN designation.

4. The apparatus of claim 1, wherein the frame mapping logic is further operable to associate the received network message with the particular provider CoS value by writing the particular provider CoS to a field of the received network message.

5. The apparatus of claim 1, further comprising:
a plurality of transmission queues, each transmission queue configured to buffer network messages prior to forwarding by the apparatus, wherein the received network message is placed in a selected transmission queue based upon the received network message's associated particular provider CoS value.

6. The apparatus of claim 1, wherein the VLAN mapping data structure is an Ingress VLAN mapping data structure, and the apparatus further comprises:
an Egress VLAN mapping data structure accessible to the frame mapping logic, the Egress VLAN mapping data structure operable to map one or more provider VLAN designations to an indication whether a provider VLAN designation should be written to a field of a network message.

7. The apparatus of claim 1, wherein the received network message has a format that complies with the Institute of Electrical and Electronics Engineers (IEEE) 802.1Q specification standard and the received network message includes a VLAN Identifier (VID) field that carries the received network message's customer VLAN designation.

8. The apparatus of claim 1, wherein the frame mapping logic is further operable to classify the received network message as a customer Bridge Protocol Data Unit (BPDU), and, in response to the classification, to apply a destination address of the received network message to a Bridge Protocol Data Unit (BPDU) Recognition and Translation data structure that maps one or more first destination addresses to second destination addresses, the frame mapping logic to derive a particular second destination address from the BPDU Recognition and Translation data structure.

9. The apparatus of claim 8, wherein the frame mapping logic is further operable to write the particular second destination address to a field of the received network message.

10. A method comprising:
configuring a first port of a device to provide connectivity to a customer network and a second port of the device to provide connectivity to a provider network;
receiving a network message on the first port, the received network message including a particular customer VLAN designation and a particular customer Cost of Service CoS value;

mapping the particular customer VLAN designation provided in the received network message to a particular provider VLAN designation and to an identification of a CoS mapping;
using the identified CoS mapping to map the particular customer CoS value to a particular provider CoS value;
associating the received network message with the particular provider VLAN destination and the particular provider CoS value; and
passing the received network message toward the second port.

11. The method of claim 10, wherein the step of associating further comprises writing the particular provider VLAN designation to a field of the received network message, so that the received network massage includes both the particular customer VLAN designation and the particular provider VLAN designation.

12. The method of claim 10, further comprising:
making a forwarding decision for the received network message based at least in part on the particular provider VLAN designation.

13. The method of claim 10, wherein associating the received network message with the particular provider CoS value further comprises writing the particular provider CoS value to a field of the received network message.

14. The method of claim 10, further comprising:
placing the received network message in a selected transmission queue of a plurality of transmission queues, based upon the received network message's associated particular provider CoS value.

15. The method of claim 10, further comprising:
mapping the particular provider VLAN designation to an indication of whether a provider VLAN designation should be written to a field of the received network message.

16. The method of claim 15, further comprising:
classifying the received network message as a customer Bridge Protocol Data Unit (BPDU);
mapping a particular first destination address of the received network message to a particular second destination address; and
writing the particular second destination address to a field of the received network message.

17. An apparatus comprising:
means for configuring a first port of a device to provide connectivity to a customer network and a second port of the device to provide connectivity to a provider network;
means for receiving a network message on the first port, the received network message including a particular customer VLAN designation and a particular customer Cost of Service (CoS) value;
means for mapping the particular customer VLAN designation provided in the received network message to a particular provider VLAN designation and to an identification of a CoS mapping;
means for accessing the identified CoS mapping to map the particular customer CoS value to a particular provider CoS value;
means for associating the received network message with the particular provider VLAN designation and the particular provider CoS value; and
is means for passing the received network message toward the second port.

18. The apparatus of claim 17, wherein the means for mapping is further operable to associate the received network message with the particular provider VLAN designation by writing the particular provider VLAN designation to a field of the received network message, so that the received network massage includes both the particular customer VLAN designation and the particular provider VLAN designation.

19. The apparatus of claim 17, further comprising:
means for forwarding operable to make a forwarding decision for the received network message based at least in part on the particular provider VLAN designation.

20. The apparatus of claim 17, wherein the means for associating is further operable to associate the received network message with the particular provider CoS value by writing the particular provider CoS to a field of the received network message.

* * * * *

UNITED STATES PATENT AND TRADEMARK OFFICE
CERTIFICATE OF CORRECTION

PATENT NO. : 7,499,456 B2  Page 1 of 1
APPLICATION NO. : 11/651145
DATED : March 3, 2009
INVENTOR(S) : Suran S. De Silva It is certified that error appears in the above-identified patent and that said Letters Patent is hereby corrected as shown below:

Col. 2, Line 65, please amend as shown:

a [[user_Priority]] user priority field 118, a Canonical Format Indicator (CFI)

Col. 13, Line 56, please amend as shown:

into the frame's provider [[user_Priority]] user priority field 728. That is, the Col. 14, Line 17, please amend as shown:

frame's customer[[ VIED]] VID field 722, i.e., the frame's original

Col. 15, Line 6, please amend as shown:

122 and the customer CoS value of [[user_Priority]] user priority field 118 in

Col. 20, Line 64, please amend as shown:

ferent customer VLANs[[ 20]] to access ISP 1 can nonetheless all

Col. 22, Line 1, please amend as shown:

[[is ]]the frame mapping logic is further operable to associate

Col. 22, Line 67, please amend as shown:

[[CoS]](CoS) value

Col. 24, Line 21, please amend as shown:

[[is ]]means for passing the received network message toward

Signed and Sealed this

Seventh Day of September, 2010

David J. Kappos
*Director of the United States Patent and Trademark Office*